June 15, 1971  C. A. HEYNE ET AL  3,585,016
PLURAL PARISON PRESSING APPARATUS FOR MAKING GLASSWARE
Filed Aug. 30, 1968  3 Sheets-Sheet 3

INVENTOR.
CLARENCE A. HEYNE
BY GEORGE W. IRWIN
ATTORNEYS

United States Patent Office 3,585,016
Patented June 15, 1971

3,585,016
PLURAL PARISON PRESSING APPARATUS FOR MAKING GLASSWARE
Clarence A. Heyne, Toledo, and George W. Irwin, Holland, Ohio, assignors to Owens-Illinois, Inc.
Filed Aug. 30, 1968, Ser. No. 756,489
Int. Cl. C03b 11/00
U.S. Cl. 65—246                      5 Claims

ABSTRACT OF THE DISCLOSURE

The pressing of glass parisons in a glass forming machine where plural charges are pressed simultaneously. The pressing plungers are advanced from a gob or charge loading position where the plungers extend through the neck molds and partially into the body molds, to a partial pressing position by the operation of a single hydraulic motor and the final press of the parisons is accomplished by application of equal force to all plungers or alternatively, by preselected different forces, but the plungers are capable of independent movement. Initial retraction of the plungers is carried out individually and then the single hydraulic motor completes the full plunger retraction from the molds.

BACKGROUND OF THE INVENTION

This invention relates to apparatus for pre-forming plural parisons simultaneously, wherein charges of glass are supplied through the open upper end of the plural cavity parison mold. The pressing plungers are normally positioned so that they extend part-way into a parison mold cavity. Thus the glass which is delivered to the cavities will drape itself to a certain extent over the upper ends of the plungers. After delivery is complete, a baffle is positioned to close the upper end of the cavities and plungers are then moved upwardly to press the glass in the area surrounding the plunger defined by the mold cavity. In this way the glass is forced downward into intimate contact with the neck mold which is conventionally positioned beneath and in communication with the parison mold cavity. A parison mold may either be of a single piece construction or split construction, as shown in the accompanying drawings. If the mold is a single piece it is necessary that the molds be raised upwardly after pressing of the parisons is completed and retraction of the plungers is carried out. The glass parisons, still retained by the neck molds, are inverted through 180° by the usual neck mold invert arm mechanism. After inversion, the parisons are then blown to final bottle or container form within blow molds. Glass forming machines have conventionally used air or fluid motors to actuate the plungers for pressing the glass and where there have been more than one parison being formed at a time, it has been the practice to mechanically join the plural plungers so that their operation and movement would be together.

SUMMARY OF THE INVENTION

This invention relates to two embodiments of apparatus for positioning pressing plungers into partial pressing position relative to the charges in a parison mold, with the final pressing of the glass in the parison molds being carried out by pneumatically actuated plungers which are arranged to operate independently relative to each other when plural parisons are being simultaneously formed. In one embodiment the final pressing is accomplished through the introduction of fluid to the plural motors from a single pressure source. In the second embodiment of the invention the fluid pressure introduced to the motors is independently controlled with respect to each individual motor operating a mechanically independent plunger.

BRIEF DESCRIPTION OF THE DRAWINGS

With reference to FIG. 1, there is shown what may be termed the parison pressing station of a "Triple Cavity I.S. Type Forming Machine." The pressing apparatus of the invention takes the form of a cylinder 10 mounted to the main machine base 11 by the usual bolts 12. The cylinder 10 has a central cylindrical cavity 13. The cavity 13 is closed by a cylinder head 14. The cylinder head 14 is formed with a downwardly extending, annular piston rod-guiding boss 15. As can be seen when viewing FIG. 1, the boss extends within the interior of the cavity 13. A piston 16 is positioned within the cavity 13 in the area beneath the lower end of the boss 15. A piston rod 17 which extends upwardly through the boss 15 is fixed to the piston 16 by a nut 18. The upper end of the piston 17 takes the form of an elongated housing 19 within which three symmetrically located and equi-spaced cylindrical cavities 20, 21 and 22 are formed. Each of the cavities 20 through 22 contains a piston member 23. Each of the piston members 23 is provided with a downwardly extending vent conduit 24 which extends through the lower wall of the housing 19. Each of the piston members 23 supports and is connected in axial alignment with pressing plungers 25 by a coupling member 26.

Figure 1:
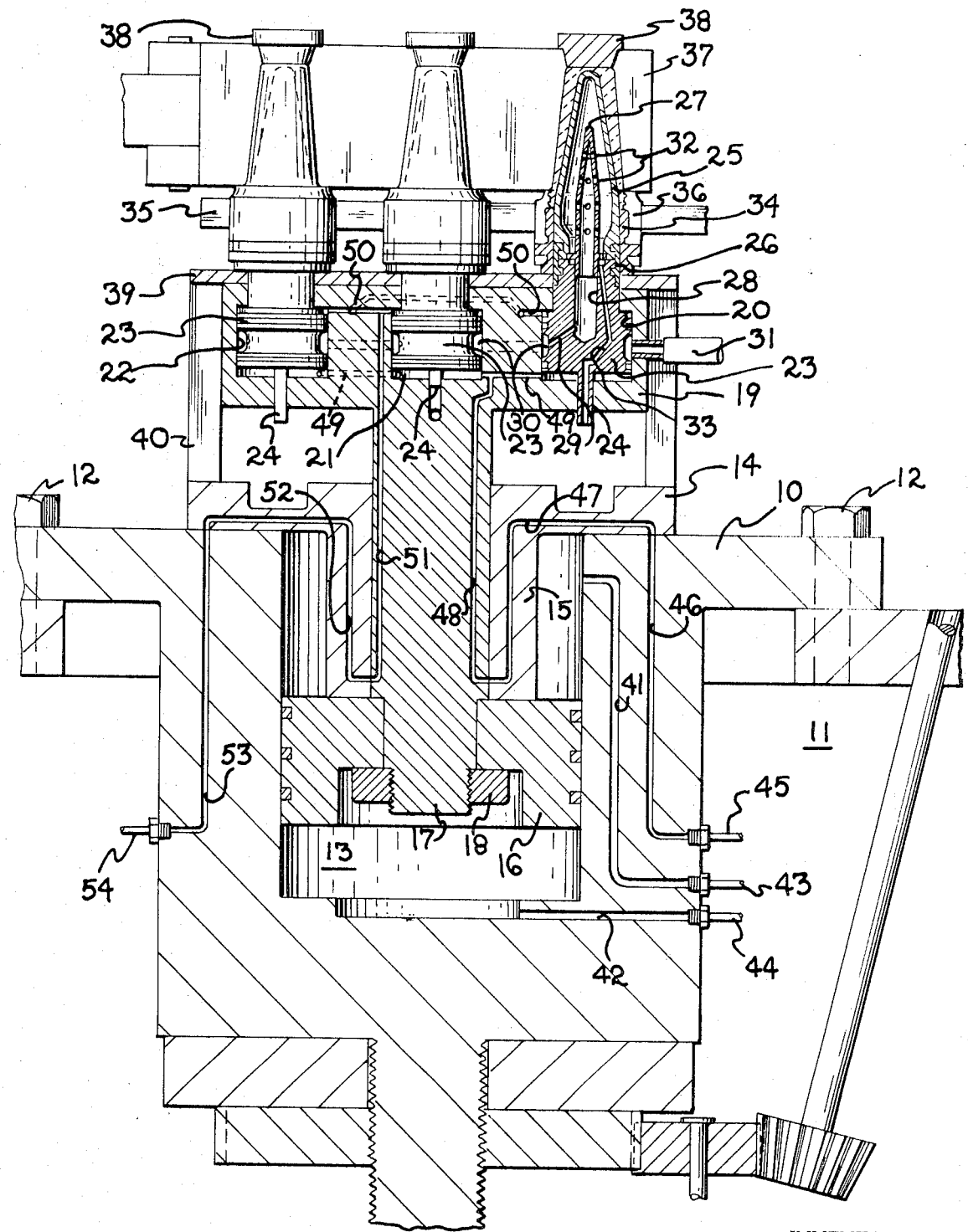
FIG. 1 is a vertical, sectional view of one embodiment of the pressing apparatus of the invention.

As clearly shown in FIG. 1, the plungers 25 are hollow and each plunger is provided with an axially positioned air distributor tube 27. As can be seen, the distributor tubes 27 seat on the upper face of the piston members 23 and with a portion thereof extending into a cavity 28 formed within the piston members 23. Radial passages 29, only one of which is shown in FIG. 1, extend from the cavity 28 to a relieved area 30 formed in the outer cylindrical surface of each of the piston members 23. Coolant is supplied to the relieved area 30 of each of the pistons through a pipe 31 extending through the side wall of the housing 19. In this manner coolant which is supplied through a pipe 31 will pass into the area 30 and through the radial passages 29 to the cavity 28 of the piston members 23, then through perforations 32 formed in the distributor tubes 27 to impinge the air on the interior of the plungers.

Exhaust of the air from the interior of the plungers is provided by a plurality of passages 33, only one of which is clearly shown, which extend from the upper face of the piston members 23 to the vent conduits 24. In this manner continuous cooling is supplied to the interior of the plungers. Furthermore, since the extent of travel of the piston members 23 is relatively small and the relieved area 30 of the piston members 23 is sufficiently long that coolant communication will be maintained throughout the total up and down movement of the piston members 23 relative to the housing 19.

The plungers are guided in their vertical reciprocation by annular thimbles 34. The thimbles 34 are positioned by the invert arm 35 so as to be in vertical alignment with the plungers 25. As can readily be seen, the thimbles 34 are retained in the invert arm 35 by partible neck molds 36. As shown, the neck molds 36 are split along the vertical plane of the section taken at the right-hand side of FIG. 1. Normally, the thimbles 34 are single, annular members supported by and riding on internal ledges formed in the partible neck mold halves. Obviously, the neck molds must be capable of opening and closing in order to release the neck of the ware, since the threads or other finish-attaching means provided on the glass finish must be capable of release. However, the neck molds normally do not open so far that the thimble will be disengaged therefrom.

The plungers, in the position shown in FIG. 1, are in full pressing position with the parison mold 37, only one-half of which is shown, in closed position with the usual baffles 38 closing the upper ends of the molds. The mechanism for manipulating the baffles is not shown since this is considered to be a relatively conventional mechanism. Suffice it to say that the baffles are raised out of the upper ends of the parison molds and moved laterally an amount sufficient to permit loading of the molds and also to permit the invert movement of the parisons and invert arm. Likewise, the molds 37, when of the two-piece hinged design, as shown, must open sufficiently to permit the invert arm, neck mold, thimble and parison to be moved upwardly through an invert arc. When the parison mold is of the so-called one-piece type, it is still essential that the baffles be present; however, in this arrangement the parison molds are lifted vertically sufficient to strip them from the upstanding parisons and then are moved laterally so as to provide sufficient clearance to permit the invert movement of the parisons by the invert arm.

As can be seen in FIG. 1, the plungers 25 are also piloted in their vertical reciprocation to a certain extent, by an upper cross-head 39. The cross-head 39 has openings formed therein corresponding to the size and location of the piston members 23 and is supported by a plurality of upstanding pillars 40 connected at their lower ends to the cylinder head 14.

It should be kept in mind that the thimble 34 and neck mold 36 are normally mounted in the invert arm with a slight amount of lateral play so that they may precisely align themselves with the plunger and parison mold cavity.

As can be seen when viewing FIG. 1, vertical reciprocation of the piston 16 and the housing 19 is accomplished by the introduction of fluid under pressure to the cylindrical cavity 13 by way of a pair of passages 41 and 42, passage 41 opening into the cavity at a point above the travel of piston 16 and the passage 42 entering the cavity at a point below the piston 16. Pressure fluid is introduced to the passages through a pair of connecting pipes 43 and 44 respectively. Obviously, when pressure is introduced through the pipe 44, the pipe 43 will be exhausted raising the piston to the position shown in FIG. 1.

Fluid pressure for raising the piston members 23 is supplied through a pipe 45, connected to a passage 46 which extends through the wall of the cylinder 10 communicating with a passage 47 in the head 14. The passage 47 opens out of the surface of the annular boss 15. In the position shown, with the piston 16 raised, the end of the passage 47 communicates with a passage 48 extending upwardly through the piston rod 17, with its upper end branching into passages 49 which open into the lower end of the cylindrical cavities 20, 21 and 22. As previously explained, the particular position of the piston members 23, in FIG. 1, is in final pressing position; thus, pressure is present beneath the piston members 23.

The upper end of the cylindrical cavities 20, 21 and 22 is connected together by passages 50 which in turn connect to a passage 51 which extends downwardly through the piston rod 17 to open outwardly at the side surface of the piston rod. A cooperatively positioned passage 52 is in alignment with the end of the passage 51 and extends through the cylinder head 14 to a passage 53 in the cylinder 10 where it is connected to a pipe 54.

After the pressing of the parison is completed, pipe 45 will be switched to exhaust and fluid under pressure will be introduced through the pipe 54 to, in effect, retract the plungers 25, then fluid under pressure will be introduced through the pipe 43 and the pipe 44 will be connected to exhaust, to cause downward movement of the piston 16 to complete the retraction of the plungers 25 from the parisons. The molds 37 will then be removed from the parisons, the parisons transferred to the blow station where they are released by opening of the neck molds. The invert arm 35 will be reverted to place the neck molds in alignment over the plungers 25 and the parison molds again closed in preparation for the charge of glass to be delivered to the upper end thereof. With the charge in the mold and baffles 38 in place, fluid under pressure will be introduced through the pipe 44 with the pipe 45 connected to exhaust to effect the preliminary pressing of the glass. Final pressing of the glass cannot take place until the piston rod 17 has moved upwardly to the point shown in FIG. 1, at which time the passages 47 and 48 will be aligned and passages 51 and 52 will also be in alignment.

As can readily be seen, the foregoing apparatus operates to effect equal force on the pressure members 23 since all are connected to a common pressure source (not shown) through the pipe 45.

Figure 2:
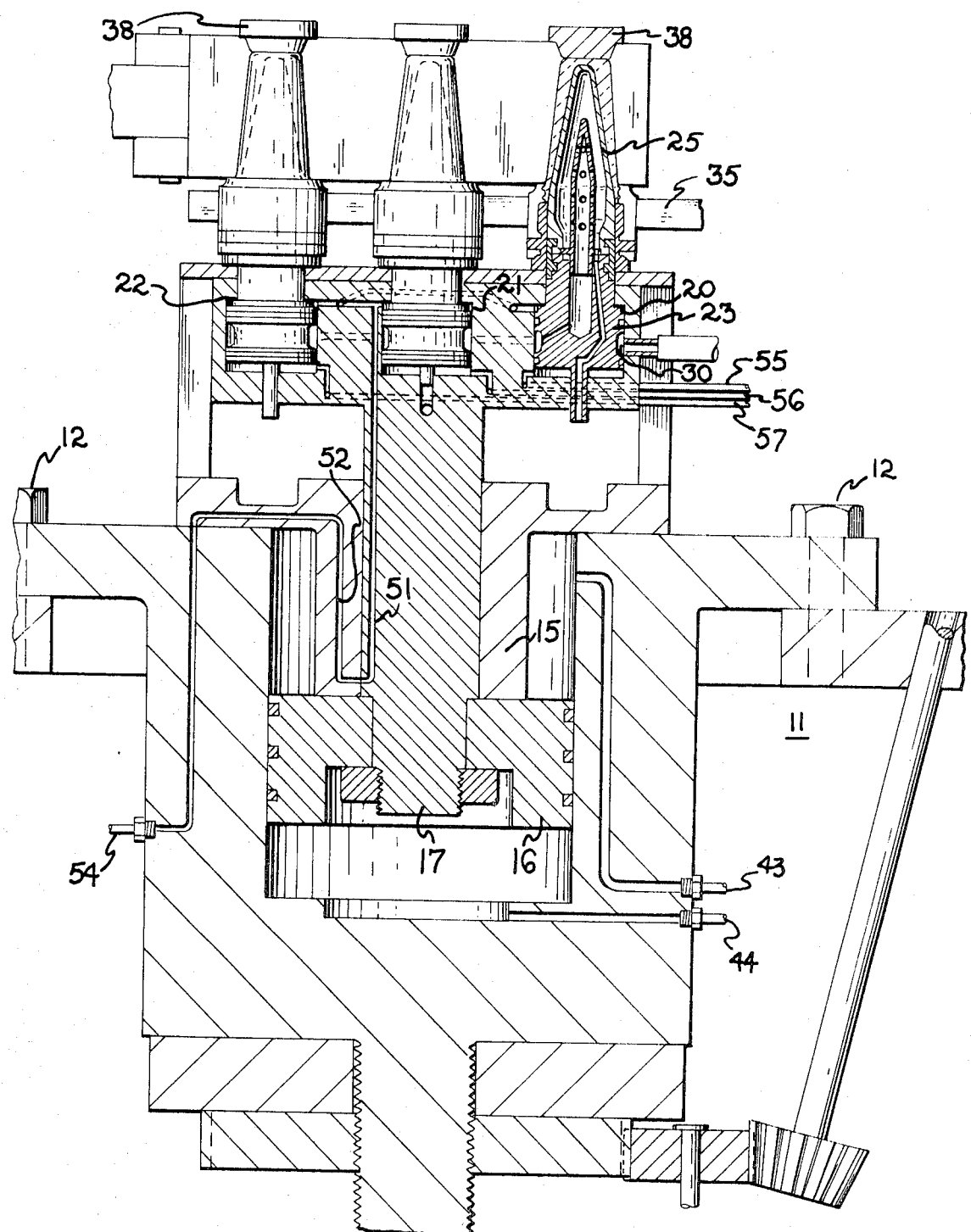
FIG. 2 is a vertical, sectional view of a second embodiment of the pressing apparatus of the invention.

Turning now to FIG. 2, wherein the apparatus is substantially identical to that disclosed in FIG. 1, like mechanisms are given the same reference numerals as those applied to FIG. 1.

The mechanism functions in substantially the same manner, with the exception that the pressure which is introduced beneath the piston members 23 does not come from a common source but is separated so that each of the piston members 23 is connected to an individually regulated pressure source. This is accomplished by having each of the piston members 23 individually controlled by the flow of fluid under pressure through separate pipes 55, 56 and 57. Exhaust of pressure from the cylindrical cavities 20, 21 and 22 is still accomplished in the same manner as that discussed above with respect to the embodiment of FIG. 1. Again, the piston 16 and the piston rod 17 must be in the up position, with the piston 16 engaging the lower end of the boss 15 so that the passages 52 and 51 will be in alignment. Thus, preliminary pressing of the glass is carried out by the raising of the piston 16 and it is impossible for any fluid under pressure which might be accidentally introduced through the pipes 55, 56 or 57 to cause the piston members 23 to move upwardly, since the cylinders will not be exhausted until the piston rod 17 has reached the up position.

Figure 3:
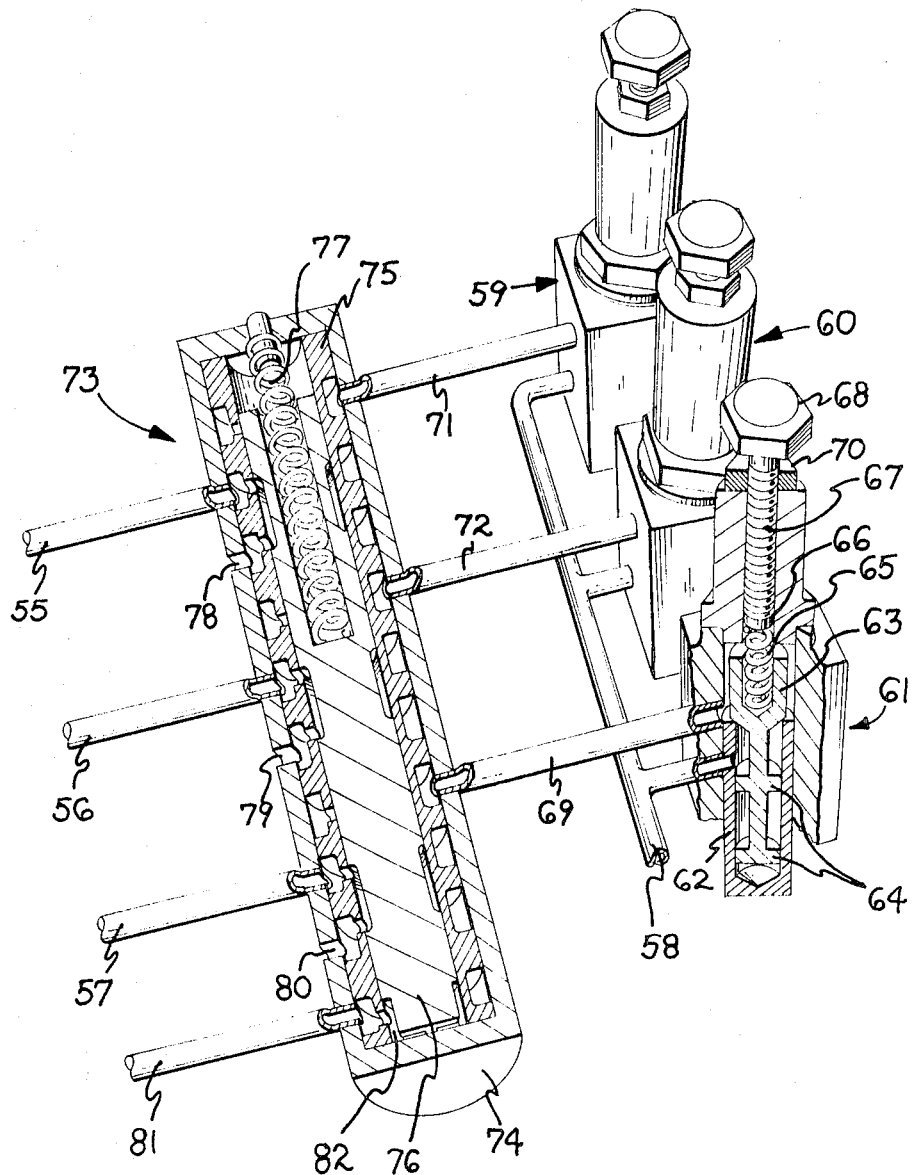
FIG. 3 is a perspective view, partly in section, of the pressure control mechanism used in association with the embodiment of FIG. 2.

The control and timing of the fluid under pressure which is introduced through pipes 55, 56 and 57 is shown in detail in FIG. 3, wherein a manifold pipe 58, connected to a source of fluid under pressure, is connected to three separate fluid pressure regulators 59, 60 and 61.

As can readily be seen by viewing the sectional cutout of the regulator 61, fluid under pressure entering through a sleeve 62 will be throttled depending upon the position of a valve member 63. The valve member 63 is provided with a pair of dampening veins 64 which cooperate with oil which is put in the lower end of the sleeve 62. The upper end of the valve member 63 is provided with a recess within which one end of a compression spring 65 is seated. The other end of the compression spring bears against a pad 66 carried at the lower end of a threaded adjusting screw 67. Thus it can be seen that by rotation of the screw 67 through its head 68 the vertical position of the pad 66 and the amount of force exerted by the spring 65 may be selectively adjusted so as to bias the valve member 63 toward the upper end of the sleeve 62 and effectively throttle and control the flow of fluid entering the pressure regulator 61 from the manifold pipe 58. In this way the output pressure of fluid exiting through a pipe 69 is controlled. The adjusted position of the screw 67 is locked in the usual manner by a locking nut 70. In a like manner the fluid exiting from the regulators 59 and 60 through pipes 71 and 72 may be independently controlled. Inasmuch as it is essential that the controlled fluid pressure flow in the pipes 69, 71 and 72 be properly timed in their application, a spool valve generally designated 73 is provided.

The spool valve takes the form of a cylindrical housing 74 having three inlet ports to which the pipes 69, 71 and 72 are connected and three exit ports to which the pipes 55, 56 and 57 are connected. A sleeve 75 is positioned within the housing 74, with the sleeve having a plurality of undercut portions which correspond to the openings in the housing.

A valve spool 76 is mounted within the sleeve and is spring-biased in the position shown by a spring 77. With the spool in the position shown, the pipes 55, 56 and 57 are connected to exhaust ports 78, 79 and 80. This would correspond to that period of operation of the apparatus when the piston members 23 are retracted. When the period of time for advancing the piston members 23 for final pressing has arrived, fluid under pressure is introduced through a pipe 81 which is connected to a chamber 82 formed at the end of the valve spool 76 opposite the spring-biased end, to shift the spool 76 and to thereby place the pipe 71 in communication with pipe 55, as well as the pipes 72 with 56 and 69 with 57. Thus it can be seen that the regulated output pressure from the regulators 59, 60 and 61 will be fed to the pipes 55, 56 and 57 to thereby independently carry out the final pressing of the parisons under whatever preselected pressure is found to be desirable for each parison formation.

The principal advantage of this ability to press the parisons with a final pressing force which may be different, as between the three parisons being formed, is that the glass may be at different temperatures with the viscosity of the glass therefore being different as between the three parisons being formed.

The independent movement of the plungers 25 under the separate control of the pistons 23, which is a common factor between the embodiments of FIG. 1 and FIG. 2, is desirable when considering the fact that the volume of glass delivered from a feeder in the form of gobs to the individual mold cavities may not be precisely identical. Thus each of the pistons may move upwardly, as viewed in FIG. 1 or FIG. 2, to different stopping or final pressing positions.

Other and further modifications may be resorted to without departing from the spirit and scope of the appended claims.

We claim:

1. Glass pressing apparatus comprising a base, a vertically mounted main cylinder, a piston slidably mounted in said cylinder, a piston rod connected to said piston, a cylinder end closing member, said member being formed with an annular, inwardly extending, guiding sleeve, the inner end of said sleeve serving as a piston stop, a cross-head connected to the extending end of said piston rod, a plurality of cylinders having parallel, vertical axes mounted on said cross-head, piston means slidably mounted in each said plurality of cylinders, a hollow, glass pressing plunger mounted on each said piston means, means connected to each said plurality of cylinders for introducing fluid under pressure to said piston means for raising and lowering said piston means, fluid pressure means connected to said main cylinder for reciprocating said piston, said means for introducing fluid pressure connected to each plurality of cylinder means, comprising first passage means extending through said sleeve and terminating at the inner wall of said sleeve, second passage means extending from the outer wall of said piston rod to the lower end of said plurality of cylinders, said first and second passages being in alignment when the piston has moved into engagement with the inner end of the sleeve, whereby said piston means are operable when the passages are aligned and inoperative when the passages are out of alignment.

2. The apparatus of claim 1, further including a third passage means extending through said sleeve and terminating at the inner wall of said sleeve, fourth passage means extending from the outer wall of said piston to the upper ends of said plural cylinders, said third and fourth passage means being in registry when the piston is in elevated position and means connected to said first and third passage means for introducing fluid under pressure to said passages alternately, whereby said plural piston means are reciprocated.

3. The apparatus of claim 1, wherein said means connected to each said plurality of cylinders comprises pressure regulating means individual to each cylinder for controlling the pressing force of each plunger.

4. The apparatus of claim 3, further including valve means interposed said pressure regulators and said cylinders and means for operating said valve means so as to simultaneously connect all of the cylinders to said pressure regulated fluid and to exhaust fluid from said cylinders after pressing is completed.

5. Glass pressing apparatus comprising a base, a vertically mounted main cylinder, a piston slidably mounted in said cylinder, a piston rod connected to said piston, a cylinder end closing member, said member being formed with an annular, inwardly extending, guiding sleeve, the inner end of said sleeve serving as a piston stop, a cross-head connected to the extending end of said piston rod, a plurality of cylinders having parallel, vertical axes, mounted on said cross-head, piston means slidably mounted in each said plurality of cylinders, a hollow, glass pressing plunger mounted on each said piston means, separate inlet passages extending through said cross-head and connected to each cylinder at the lower end thereof and common passage means connected to the upper ends of said cylinders, said common passage means being in alignment when said cross-head has moved into engagement with the upper end of said sleeve, whereby said piston means are operable when the common passage means are aligned and inoperative when the passages are out of alignment, and fluid pressure means connected to said cylinder for reciprocating said piston.

References Cited

UNITED STATES PATENTS

| 2,508,891 | 5/1950 | Rowe | 65—243 |
| 3,434,821 | 3/1969 | Wiley | 65—320 |

FOREIGN PATENTS

| 818,405 | 9/1951 | Germany | 65—320 |

S. LEON BASHORE, Primary Examiner

R. L. LINDSAY, Jr., Assistant Examiner

U.S. Cl. X.R.

65—229, 320